(12) United States Patent
Cairo

(10) Patent No.: US 7,648,336 B2
(45) Date of Patent: Jan. 19, 2010

(54) APPARATUS AND METHOD FOR ASSEMBLING A GAS TURBINE STATOR

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 11/325,077

(22) Filed: Jan. 3, 2006

(65) Prior Publication Data
US 2007/0154307 A1    Jul. 5, 2007

(51) Int. Cl.
F01D 9/00 (2006.01)

(52) U.S. Cl. ............. 415/209.4; 415/191; 415/210.1; 415/200; 29/889.21

(58) Field of Classification Search ............. 415/191, 415/209.2, 209.3, 209.4, 200, 210.1; 29/889.22, 29/889.72; 416/232
See application file for complete search history.

(56) References Cited

U.S. PATENT DOCUMENTS

| | | | |
|---|---|---|---|
| 3,756,020 A | 9/1973 | Moskowitz | |
| 3,992,127 A * | 11/1976 | Booher et al. | 415/136 |
| 4,376,004 A | 3/1983 | Bratton | |
| 4,519,745 A | 5/1985 | Rosman | |
| 4,790,721 A | 12/1988 | Morris et al. | |
| 5,358,379 A | 10/1994 | Pepperman et al. | |
| 5,584,652 A * | 12/1996 | Shaffer et al. | 415/115 |
| 5,873,699 A * | 2/1999 | Watson et al. | 415/200 |
| 6,013,592 A | 1/2000 | Merrill et al. | |
| 6,514,046 B1 * | 2/2003 | Morrison et al. | 416/229 A |
| 6,696,144 B2 | 2/2004 | Holowczak | |
| 6,709,230 B2 | 3/2004 | Morrison | |
| 6,860,714 B1 | 3/2005 | McNulty et al. | |
| 6,969,239 B2 | 11/2005 | Grant | |
| 7,093,359 B2 * | 8/2006 | Morrison et al. | 29/889.71 |
| 7,189,064 B2 * | 3/2007 | Helder et al. | 416/232 |
| 7,258,530 B2 * | 8/2007 | Morrison et al. | 416/232 |
| 2004/0115395 A1 | 6/2004 | Cairo et al. | |

* cited by examiner

Primary Examiner—Ninh H Nguyen
(74) Attorney, Agent, or Firm—Armstrong Teasdale LLP

(57) ABSTRACT

A gas turbine stator includes a vane assembly, and a platform that is configured to receive the vane assembly. The vane assembly includes a vane and a cap. The vane extends radially from the cap. The vane includes a pressure side shell and a separate suction side shell.

19 Claims, 4 Drawing Sheets

APPARATUS AND METHOD FOR ASSEMBLING A GAS TURBINE STATOR

BACKGROUND OF THE INVENTION

This invention relates generally to gas turbine engines and more particularly, to apparatus and methods for assembling a vane and platform system.

At least some known combustion turbine engines ignite a fuel-air mixture in a combustor assembly and generate a combustion gas stream that is channeled to a turbine assembly via a hot gas path. Compressed air is channeled to the combustor assembly by a compressor assembly. Combustor assemblies typically include fuel vane assemblies that facilitate fuel and air delivery to a combustion region of the combustor assembly. The turbine assembly converts the thermal energy of the combustion gas stream to mechanical energy that rotates a turbine assembly shaft. The output of the turbine assembly may be used to power a machine, for example, an electric generator or a pump.

Known vane assemblies include a plurality of components manufactured from various materials that are difficult to fabricate. One such material is a laminated ceramic matrix composite. Typically, the laminated ceramic matrix composite has variant laminate thicknesses. Consistent laminate thickness provides for efficient fuel vane assembly operation. In addition, the laminated ceramic matrix composite has a limited ability to attain a relatively small bend radius without cracking. Furthermore, coupling the airfoil slope portion of the vane to the vane platform is a difficult process. A ceramic matrix composite vane can also be difficult to inspect once the vane is installed.

Many known turbine vane assemblies include a variety of components manufactured to interface with the platforms of the gas turbine engine. A laminated ceramic matrix composite vane can be difficult to structurally attach to the platforms of the gas turbine engine if non-integral platforms are used. Interlaminar tension stresses in the fillets exist when transitioning the vane to the platforms if integral platforms are used. Furthermore, a laminated ceramic matrix composite makes controlling resonant frequencies difficult. It is important to minimize the interlaminar stresses by maintaining inplane loading wherever possible.

BRIEF SUMMARY OF THE INVENTION

In one aspect, a gas turbine stator is provided. The gas turbine stator includes a vane assembly. The vane assembly includes a vane. The vane assembly also includes a cap. The vane in the vane assembly extends radially from the cap. The vane includes a pressure side shell and a separate suction side shell. The gas turbine stator also includes a platform that receives the vane assembly.

In another aspect, a turbine vane assembly for a gas turbine engine is provided. The vane assembly includes a suction side shell. The suction side shell includes a leading edge, a trailing edge and a convex surface therebetween. The vane assembly also includes a pressure side shell. The pressure side shell includes a leading edge, a trailing edge, and a concave surface therebetween. The leading edges of the suction side shell and the pressure side shell are maintained in relatively close proximity.

In a further aspect, a method of assembling a combustion turbine vane is provided. The method includes forming a vane with a pressure side shell and a separate suction side shell. The method also includes mating the pressure side shell to the suction side shell.

DETAILED DESCRIPTION OF THE INVENTION

Figure 1:
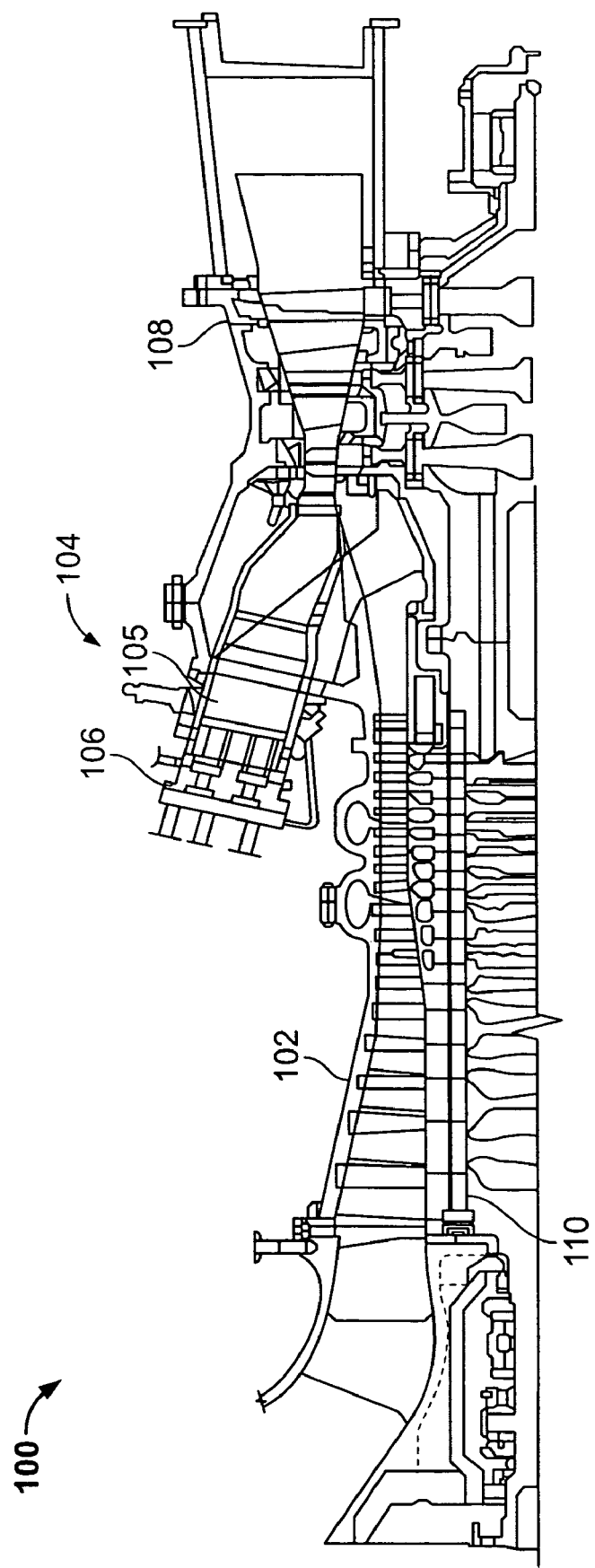
FIG. 1 is a schematic illustration of an exemplary combustion turbine engine.

FIG. 1 is a schematic illustration of an exemplary combustion turbine engine 100. Engine 100 includes a compressor 102 and a combustor 104. Combustor 104 includes a combustion region 105 and a fuel nozzle assembly 106. Engine 100 also includes a turbine 108 and a common compressor/turbine shaft 110 (sometimes referred to as rotor 110). In one embodiment, engine 100 is a MS7001FB engine, sometimes referred to as a 9FB engine, commercially available from General Electric Company, Greenville, S.C. The present invention is not limited to any one particular engine and may be implanted in connection with other engines including, for example, the MS7001FA (7FA) and MS9001FA (9FA) engine models of General Electric Company.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the exemplary embodiment, there is a plurality of combustors 104 and fuel nozzle assemblies 106. In the following discussion, unless otherwise indicated, only one of each component will be discussed.

Figure 2:
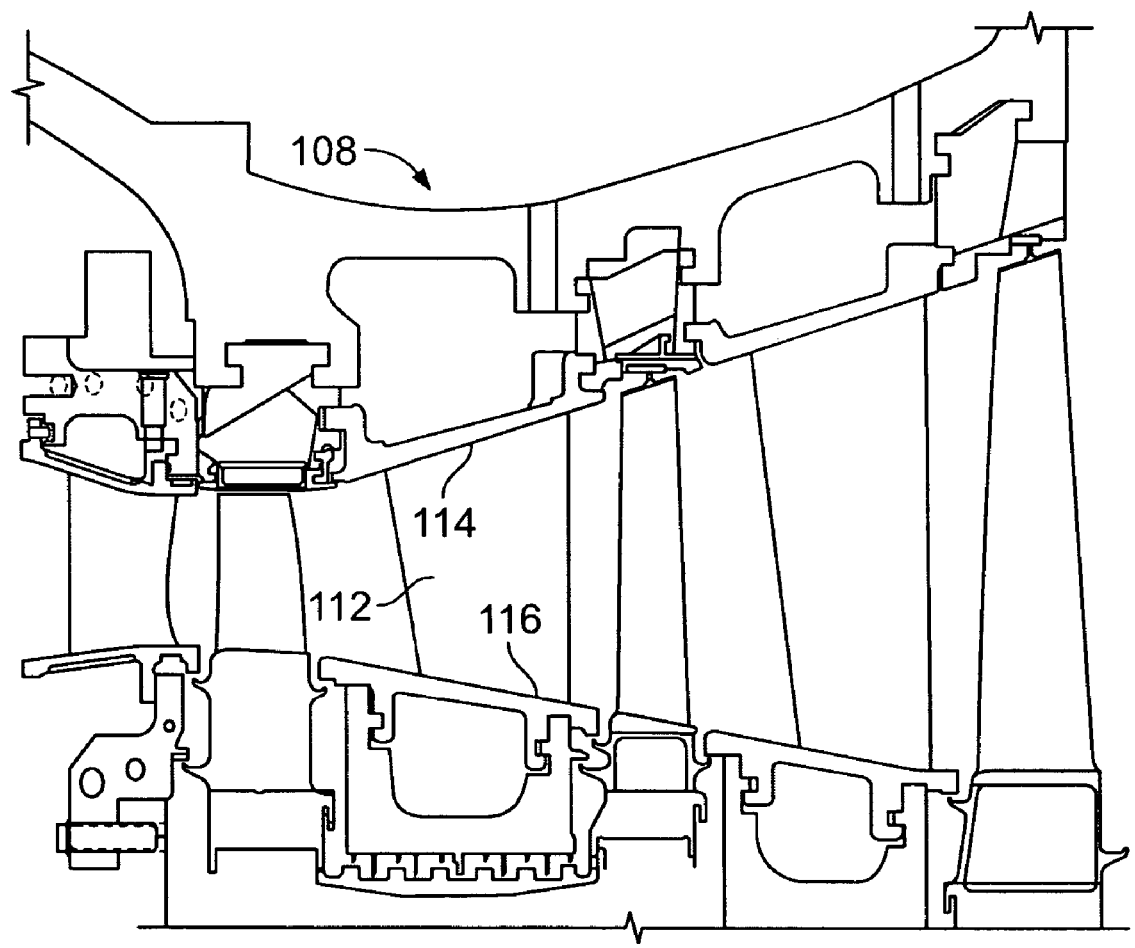
FIG. 2 is a cross-section illustration of an exemplary gas turbine assembly with a three stage nozzle that may be used with the combustion turbine engine in FIG. 1.

FIG. 2 is cross-section illustration of an exemplary turbine assembly 108 with a three stage nozzle that may be used with the combustion turbine engine 100 in FIG. 1. Turbine assembly 108 includes a vane sub-assembly 112. Vane sub-assembly 112 is held in the turbine assembly 108 by a radially outer platform 114 and a radially inner platform 116.

Figure 3:
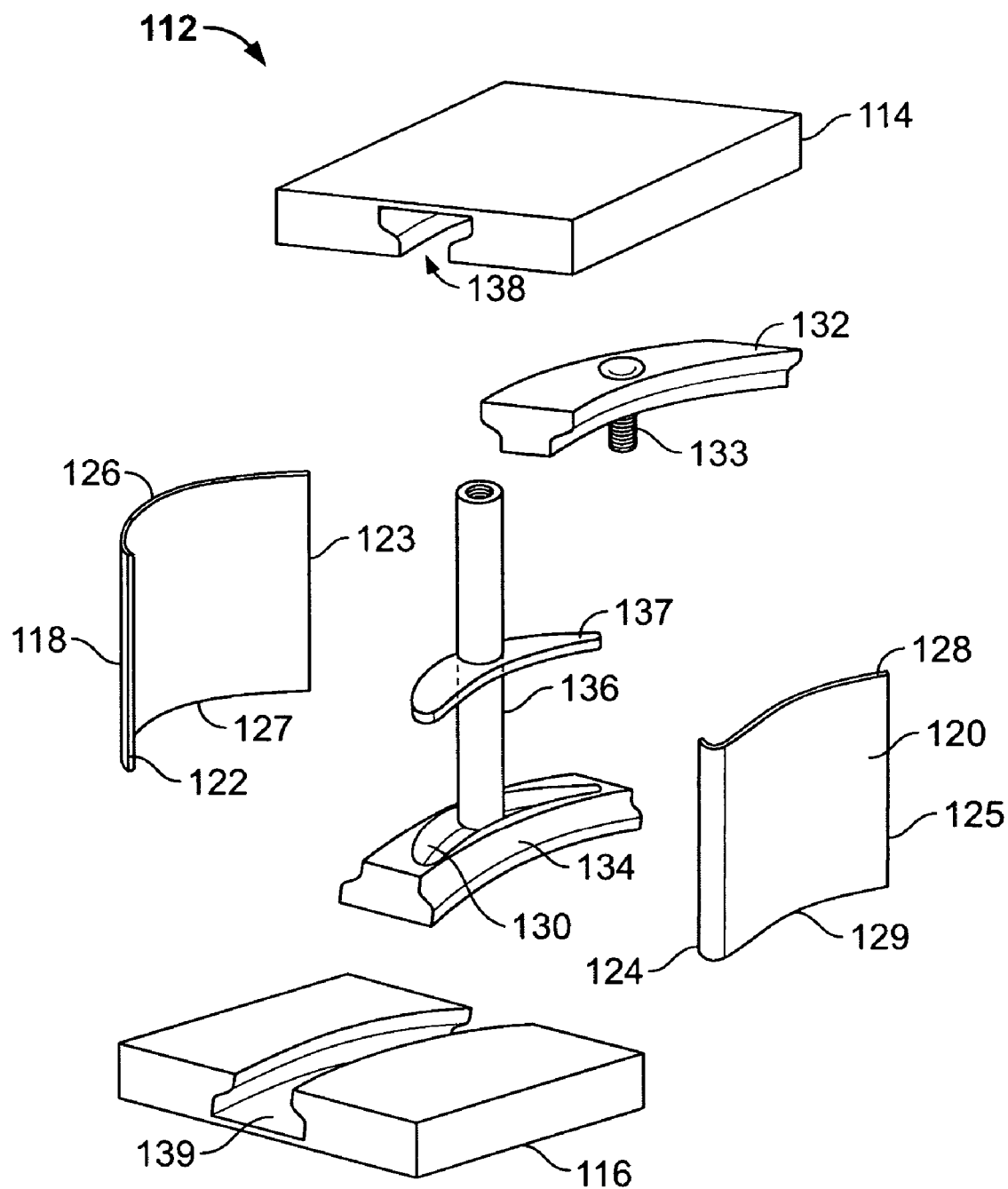
FIG. 3 is a schematic illustration of a ceramic matrix composite (CMC) turbine vane assembly that may be used with the combustion turbine engine in FIG. 1.

FIG. 3 is a schematic illustration of an exemplary embodiment of turbine vane assembly 112 that may be used with combustion turbine engine 100 in FIG. 1. Turbine vane assembly 112 includes a suction side shell 118 and a pressure side shell 120. In the exemplary embodiment, suction side shell 118 and pressure side shell 120 are fabricated from a ceramic matrix composite. The ceramic matrix composite facilitates sealing the vane. Suction side shell 118 includes a leading edge 122 and a trailing edge 123. Pressure side shell 120 includes a leading edge 124 and a trailing edge 125. Suction side shell 118 includes a convex surface, and pressure side shell 120 includes a concave surface. The concave and convex surfaces are ergonomic contours which orient or reorient the flow of combustion gases through the vane.

Leading edge 122 and leading edge 124 are positioned in relatively close proximity. Leading edge 122 and leading edge 124 can overlap, interlock, or leave a very small distance between them. Leading edge 122 and leading edge 124 comprise a mating surface configured to form a tortuous path. The tortuous path may be formed using, for example, but not limited to overlapping, a tongue and groove, a chevron shape, or a sealing member.

Trailing edge 123 and trailing edge 125 are also positioned in relatively close proximity. Trailing edge 123 and trailing edge 125 can overlap, interlock, or leave a very small distance between them. Trailing edge 123 and trailing edge 125 comprise a mating surface configured to form a tortuous path. The tortuous path may be formed using, for example, but not limited to overlapping, a tongue and groove, a chevron shape, or a sealing member.

Suction side shell 118 includes a radially outer edge 126 and a radially inner edge 127. Pressure side shell 120 includes a radially outer edge 128 and a radially inner edge 129. Pressure side shell 120 engages a contoured cavity 130 in an outer end cap 132 and an inner end cap 134 as well as suction side shell 118 engages a contoured cavity 130 in an outer end cap 132 and an inner end cap 134. Radially outer edge 126 aligns with cavity 130 in outer end cap 132. Radially outer edge 128 aligns with cavity 130 in outer end cap 132. Radially inner edge 127 aligns with cavity 130 in inner end cap 134. Radially inner edge 129 aligns with cavity 130 in inner end cap 134.

A clamping member 136 is positioned radially between outer end cap 132 and inner end cap 134. Clamping member 136 facilitates maintaining pressure side shell 120 and suction side shell 118 in a substantially fixed orientation with respect to each other. In addition, clamping member 136 carries structural loading for the vane assembly 112 to facilitate enabling the pressure side shell 120 and the suction side shell 118 providing aerodynamic contours. In the exemplary embodiment, radially outer end cap 132 includes a fastener 133. Fastener 133 threadably couples clamping member 136. Coupling outer end cap 132 and inner end cap 134 to clamping member 136 maintains suction side shell 118, pressure side shell 120, clamping member 136, outer end cap 132, and inner end cap 134 in fixed alignment with respect to each other. In an alternative embodiment, clamping member 136 comprises a bias member, for example, a shape memory member, a metallic spar, and/or a spring. Clamping member 136 may include cooling air to facilitate reducing heat of clamping member 136 and/or vane. Clamping member 136 may include one or more bulkheads 137 extending axially from clamping member 136. Bulkhead 137, and its prescribed positioning, facilitates reducing vibration of the vane with respect to specific, critical, resonant mode shapes.

Turbine vane assembly 112 includes radially outer platform 114 and radially inner platform 116. Radially inner platform 116 includes a plurality of axially oriented slots 139 circumferentially spaced about platform 116. Radially outer platform 114 includes a plurality of axially oriented slots 138 circumferentially spaced about platform 114. Slot 138 is configured to receive radially outer end cap 132. Slot 139 is configured to receive radially inner end cap 134.

Figure 4:
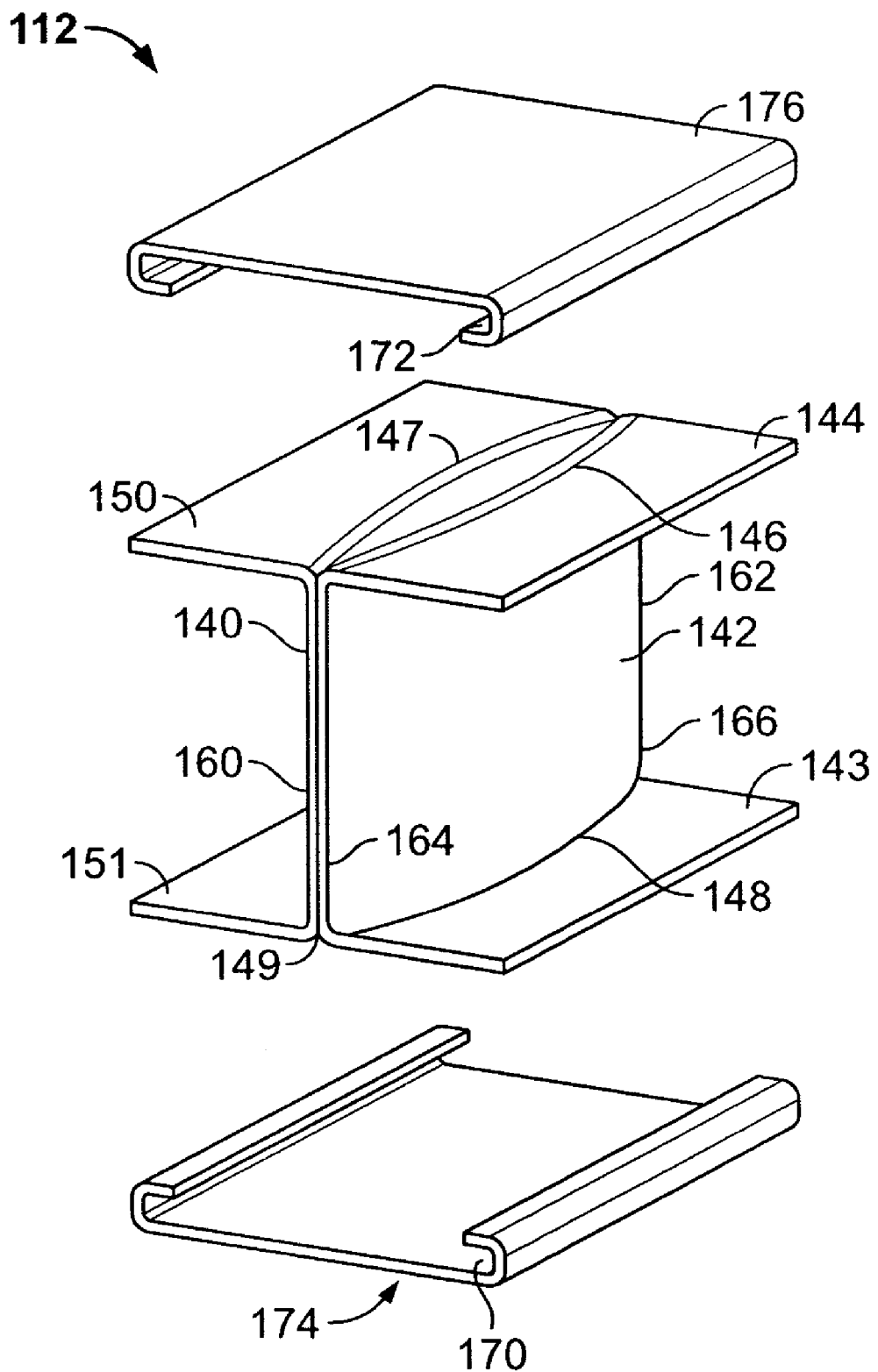
FIG. 4 is a schematic illustration of an alternative embodiment of a CMC turbine vane assembly that may be used with the combustion turbine engine in FIG. 1.

FIG. 4 is a schematic illustration of an alternative embodiment of a turbine vane assembly 112 that may be used with the combustion turbine engine 100 (shown in FIG. 1). Turbine vane assembly 112 includes a suction side shell 140 and a pressure side shell 142. In the exemplary embodiment, suction side shell 140 and pressure side shell 142 are fabricated from a ceramic matrix composite. Ceramic matrix composite facilitates eliminating sealing gaps. Suction side shell 140 includes a leading edge 160 and a trailing edge 162. Pressure side shell 142 includes a leading edge 164 and a trailing edge 166. Suction side shell 140 includes a convex surface, and pressure side shell 142 includes a concave surface. Concave surface and convex surface are ergonomic contours which orient or reorient the flow through the vane.

Leading edge 160 and leading edge 164 are positioned in relatively close proximity. Leading edge 160 and leading edge 164 can overlap, interlock, or leave a very small distance between them. Leading edge 160 and leading edge 164 comprise a mating surface configured to form a tortuous path. The torturous tortuous path may be formed using, for example, but not limited to overlapping, a tongue and groove, a chevron shape, or a sealing member.

Trailing edge 162 and trailing edge 166 are also positioned in relatively close proximity. Trailing edge 162 and trailing edge 166 can overlap, interlock, or leave a very small distance between them. Trailing edge 162 and trailing edge 166 comprise a mating surface configured to form a tortuous path. The tortuous path may be formed using, for example, but not limited to overlapping, a tongue and groove, a chevron shape, or a sealing member.

Pressure side shell 142 includes a radially outer flange 144 extending from radially outer edge 146 of the concave surface and pressure side shell 142 also includes a radially inner flange 143 extending from radially inner edge 148 of the concave surface. Suction side shell 140 includes a flange 150 extending from radially outer edge 147 of the convex surface and suction side shell 140 also includes a flange 151 extending from radially inner edge 149 of the convex surface.

Turbine vane assembly 112 comprises pressure side shell 142 and suction side shell 140. Radially inner platform 174 includes a plurality of axially oriented slots 170 circumferentially spaced about platform 174. Radially outer platform 176 includes a plurality of axially oriented slots 172 circumferentially spaced about platform 176. Slot 172 is configured to receive radially outer flange 150 and radially outer flange 144. Slot 170 is configured to receive radially inner flange 151 and radially inner flange 143.

While the invention has been described in terms of various specific embodiments, those skilled in the art will recognize that the invention can be practiced with modification within the spirit and scope of the claims.

What is claimed is:

1. A gas turbine stator comprising:
   a vane assembly comprising:
   a vane;
   an outer attachment comprising one of a radially outer end cap and a radially outer flange; and
   an inner attachment comprising one of a radially inner end cap and a radially inner flange;
   wherein said vane extends radially from said inner attachment, said vane comprising a pressure side shell and a separate suction side shell, said pressure side shell is adjacent to said suction side shell when said pressure side shell is coupled to said suction side shell; and
   a platform comprising at least one axially-oriented slot configured to receive said vane assembly.

2. A gas turbine stator in accordance with claim 1 wherein said pressure side shell includes a leading edge, a trailing edge, and a concave surface therebetween, said suction side shell includes a leading edge, a trailing edge and a convex surface therebetween, wherein said leading edge of said suction side shell and said leading edge of said pressure side shell are maintained in relatively close proximity.

3. A gas turbine stator in accordance with claim 2 wherein each of said surfaces further comprise a radially outer edge and a radially inner edge wherein said outer attachment is configured to couple to said radially outer edges of said suction side shell and said pressure side shell, and said inner attachment is configured to couple to said radially inner edges of said suction side shell and said pressure side shell.

4. A gas turbine stator in accordance with claim 2 wherein said leading and trailing edges each comprise a respective mating surface configured to form a tortuous path therebetween, wherein said tortuous paths comprise at least one of an overlap, a tongue and groove, a chevron shape, and a sealing member.

5. A gas turbine stator in accordance with claim 2 wherein said inner attachment and said outer attachment each comprise a first flange extending from said concave surface of said pressure side shell and a second flange extending from said convex surface of said suction side shell, wherein said first flange is adjacent to said second flange when said pressure side shell is coupled to said suction side shell.

6. A gas turbine stator in accordance with claim 5 wherein said platform further comprises a radially outer platform and a radially inner platform wherein said radially inner platform comprises an axially-oriented slot to receive said inner attachment, and said radially outer platform comprises an axially-oriented slot to receive said outer attachment.

7. A gas turbine stator in accordance with claim 1 wherein at least one of said suction side shell and said pressure side shell is fabricated from a ceramic matrix composite.

8. A gas turbine stator in accordance with claim 1 further comprising a clamping member configured to maintain said pressure side shell and said suction side shell in a substantially fixed orientation with respect to each other and with respect to said outer attachment and said inner attachment.

9. A gas turbine stator in accordance with claim 8 wherein said platform further comprises a radially outer platform and a radially inner platform wherein said radially inner platform comprises an axially-oriented slot configured to receive said inner attachment and said radially outer platform comprises an axially-oriented slot configured to receive said outer attachment.

10. A turbine vane assembly for a gas turbine engine, said vane assembly comprising a suction side shell that includes a leading edge, a trailing edge and a convex surface therebetween, a pressure side shell includes a leading edge, a trailing edge, and a concave surface therebetween, an inner attachment, and an outer attachment, said leading edge of said suction side shell and said leading edge of said pressure side shell are maintained in relatively close proximity when said suction side shell is coupled to said pressure side shell.

11. A turbine vane assembly in accordance with claim 10 wherein at least one of said suction side shell and said pressure side shell is fabricated from a ceramic matrix composite.

12. A turbine vane assembly in accordance with claim 10 wherein each of said surfaces further comprise a radially outer edge and a radially inner edge wherein said outer attachment is configured to couple to said radially outer edges of said suction side shell and said pressure side shell, and said inner attachment is configured to couple to said radially inner edges of said suction side shell and said pressure side shell.

13. A turbine vane assembly in accordance with claim 10 further comprises a clamping member configured to maintain said pressure side shell and said suction side shell in a substantially fixed orientation with respect to each other and with respect to said outer and inner attachments, said inner attachment is configured to couple to an axially-oriented slot of a turbine stator, and said outer attachment is configured to couple to an axially-oriented slot of a turbine stator.

14. A turbine vane assembly in accordance with claim 10 wherein said leading and trailing edges comprise a respective mating surface configured to form a tortuous path therebetween, said tortuous paths comprise at least one of an overlap, a tongue and groove, a chevron shape, and a sealing member.

15. A turbine vane assembly in accordance with claim 10 wherein said inner attachment and said outer attachment each comprise a first flange extending from said concave surface of said pressure side shell and a second flange extending from said convex surface of said suction side shell, wherein said first flange is adjacent to said second flange when said pressure side shell is coupled to said suction side shell.

16. A turbine vane assembly in accordance with claim 15 wherein said platform further comprises a radially outer platform of a turbine stator and a radially inner platform of a turbine stator wherein said radially inner platform comprises an axially-oriented slot to receive said inner attachment, and said radially outer platform comprises an axially-oriented slot to receive said outer attachment.

17. A method of assembling a turbine vane assembly in a stator that includes a radially outer platform and a radially inner platform, each having an axially-oriented slot, a vane that includes a pressure side shell and a separate suction side shell, an inner attachment, and an outer attachment, said method comprising coupling the pressure side shell and the suction side shell to the platforms using the outer attachment and the inner attachment.

18. A method in accordance with claim 17 wherein the suction side shell and the pressure side shell each includes a radially outer edge and a radially inner edge, said method further comprising coupling the radial edges to respective end caps; and clamping the end caps together such that the suction side shell and the pressure side shell are facilitated being maintained in relatively close proximity.

19. A method in accordance with claim 17 wherein the outer and inner attachments each include a flange extending away from the the convex surface of the suction side shell and a flange extending away from the concave surface of the pressure side shell wherein said method comprises mating the pressure side shell and the suction side shell to the platforms using the flanges.

* * * * *